Patented Feb. 8, 1938

2,107,367

UNITED STATES PATENT OFFICE 2,107,367

POLYSULPHONATES OF AROMATIC POLY-ALKYLENE ETHERS

Herman A. Bruson, Philadelphia, Pa., assignor to Röhm & Haas Company, Philadelphia, Pa.

No Drawing. Application January 12, 1937, Serial No. 120,180

10 Claims. (Cl. 260—150)

This invention relates to sulphonated aryloxypolyalkylene ethers which contain at least two sulphonic acid groups, one of which is attached to a carbon atom of the alkylene group situated farthest from the aromatic ring, and the others are attached to the aromatic nucleus. These new compounds in their acid form have the general formula A—R—O—(C$_n$H$_{2n}$—O—)$_x$—C$_n$H$_{2n}$—SO$_3$H
   |
   (SO$_3$H)$_y$ where R is an aromatic ring, preferably of the benzene or naphthalene series, that can contain a nuclear substituent "A" which is a member of the group consisting of hydrocarbon, acyl, alkoxy, halogen and nitro radicals; C$_n$H$_{2n}$ is an alkylene group in which "$n$" is greater than 1, and in which at least 2 carbon atoms separate alternate ether oxygen atoms —O—; "$x$" is 1 to 2; and "$y$" is equal to 1 or 2.

The above acids, in the form of their water-soluble alkali metal-, ammonium-, or amine salts where R is benzene or naphthalene, and A is an aliphatic chain having four or more carbon atoms, show marked capillary activity in aqueous solutions and are useful as textile assistants, dispersing, cleansing, emulsifying, wetting, introfying and spreading agents. Particularly effective for these purposes are those water-soluble salts in which A is an alkyl or aliphatic acyl radical having from 8 to 18 carbon atoms inclusive.

This application is a continuation-in-part of my copending application Serial No. 86,344 filed June 20, 1936.

In practicing the invention, compounds of the above type are, for practical reasons, preferably made by first sulphonating the aromatic nucleus R of a monochloraryloxy polyalkylene ether having the formula A—R—O—(C$_n$H$_{2n}$—O—)$_x$—C$_n$H$_{2n}$—Cl neutralizing the sulphonic acid formed with an alkali, ammonia or an amine, and subsequently heating an aqueous solution of this product with sodium sulphite, preferably under pressure. The sulphonation of the nucleus R is carried out with chlorsulphonic acid, concentrated or fuming sulphuric acid, or with sulphur trioxide, at a low temperature (0° to 40° C.) so as to form a mono- or polysulphonic acid. After neutralizing with caustic alkali, ammonia, amines, or any other water-soluble base, an aqueous solution of the product is heated with a molecularly equivalent quantity of a water-soluble metal sulphite at 130-190° C. for several hours, whereby the terminal halogen atom is replaced by an SO$_3$M group where M is the metal. The order in which the sulphonic groups are introduced can be reversed by reacting the complex ether chloride with sodium sulphite first and then sulphonating the aromatic nucleus by the methods above indicated. That procedure has the disadvantage, however, that it necessitates drying the sodium sulphite reaction product prior to sulphonating the aromatic nucleus. Instead of the chloroether, the corresponding bromo- or iodo ethers can be used, but, of course, with no advantage.

The products obtained are extremely water-soluble and give no precipitate with hard water. They are resistant to hot, boiling, dilute acids or alkalis, and are unusually effective capillary-active materials at extremely low concentrations.

Among typical ethers which give the most useful capillary-active compounds when treated according to this invention, the following are the most important:

1. A—R—O—CH$_2$CH$_2$—O—CH$_2$CH$_2$Cl
2. A—R—O—CH$_2$CH$_2$—O—CH$_2$CH$_2$—O—CH$_2$CH$_2$Cl
3. A—R—O—CH$_2$—CH—O—CH—CH$_2$Cl
            |       |
            CH$_3$  CH$_3$ wherein R is a phenyl group and A is an alkyl radical or aliphatic acyl group containing from eight to eighteen carbon atoms inclusive.

These are obtained by heating the corresponding alkyl, or acyl phenols, A—ROH, with an excess of one of the following dichloroethers, respectively, in the presence of caustic alkali, so as to etherify only one end of the chain:

1. β,β'-dichlorodiethyl ether,

ClC$_2$H$_4$—O—C$_2$H$_4$Cl

2. β-chloroethoxy-β'-chlorodiethyl ether,

ClC$_2$H$_4$—O—C$_2$H$_4$—O—C$_2$H$_4$Cl

3. β,β'-dichlorodiisopropyl ether,

ClCH$_2$—CH(CH$_3$)—O—(CH$_3$)CH—CH$_2$Cl

Such monochloraryloxy-polyalkylene ethers and their process of preparation are described in my copending patent applications Serial No. 79,718 filed May 14, 1936, and No. 82,183 filed May 28, 1936.

The following examples are given to illustrate the invention. It is not, however, limited to the exact reagents, time, temperature and conditions of operation shown, as it may otherwise be practiced within the scope of the appended claims.

*Example 1*

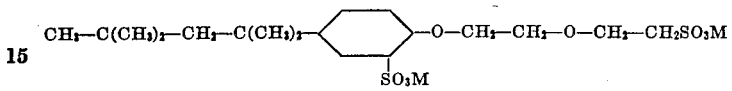

(a) To 156 g. of β-(p-α,α,γ,γ-tetramethylbutylphenoxy)-β'-chlorodiethyl ether there is added, while stirring and cooling to about 5° C., 59 g. of chlorsulphonic acid. The mixture is stirred for 4 to 5 hours at 5 to 10° C. and then allowed to come to room temperature and stirred for 3 hours longer until evolution of hydrogen chloride ceases and a sample of the product is soluble in water. The red, viscous sirup of the sulphonated chloroether thus obtained is neutralized with a 10% aqueous sodium hydroxide solution to pH 7.5.

This solution is mixed with 66 g. of anhydrous sodium sulphite (95.3% purity) and 250 cc. of water, and heated in an iron autoclave at 180–190°˙C. for six to seven hours. Any traces of sulphite are then destroyed by the careful addition of dilute hydrochloric acid and warming until sulphur dioxide is no longer detectable. The solution obtained is then filtered to remove traces of iron. The clear, pale yellow filtrate obtained is then adjusted to pH 7.5. It is an extremely powerful dispersing agent for colloidal sulphur, and certain dyes. It gives no precipitate with a 5% solution of calcium chloride, magnesium sulphate, alum, or ferric chloride. It readily disperses freshly precipitated calcium soaps of oleic, palmitic and stearic acids. The dry solid compound may be obtained by evaporating the water, as for example, by spray-drying. It forms a white powder which dissolves readily in water to give clear, foamy, soapy solutions. These solutions show good detergent properties and are stable to dilute acids and alkalies.

The β-(p-α,α,γ,γ-tetramethylbutylphenoxy)-β'-chlorodiethyl ether used in the above example is obtained by heating p-α,α,γ,γ-tetramethylbutylphenol (1 mol.) with β,β'-dichlordiethyl ether (3 mols) and a 50% sodium hydroxide solution containing 1.17 mols of sodium hydroxide for 8 hours at 110–115° C., with constant stirring, filtering off NaCl, and distilling the product. It is a colorless oil boiling at 177 to 178° C./4 mm.

Instead of neutralizing the sulphonic acid with sodium hydroxide solution, potassium hydroxide, sodium or potassium carbonate, ammonium hydroxide, methylamines, or mono-, di-, or triethanolamine may be used. Potassium sulphite can be used in place of sodium sulphite, if desired.

(b) The β-(p-α,α,γ,γ-tetramethylbutylphenoxy)-β'-chlorodiethyl ether may be replaced in the above example by any of the following ethers to yield analogous products.

1. β-(sec-octylphenoxy)-β'-chlorodiethyl ether, a colorless oil, B. P. 189–194° C./5-6 mm., made by condensing sec-octylphenol (caprylphenol) with β,β'-dichlorodiethyl ether.
2. β-(α-ethylhexylphenoxy)-β'-chlorodiethyl ether, a colorless oil, B. P. 185–210° C./5 mm., made by condensing alphaethyl-n-hexylphenol with β,β'-dichlorodiethyl ether.
3. β-(n-octylphenoxy)-β'-chlorodiethyl ether, made from n-octyl-phenol and β,β'-dichlorodiethyl ether.

*Example 2*

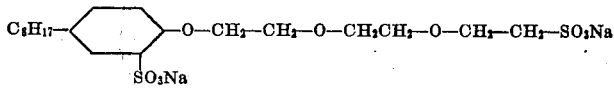

To 173 g. of β-(p-α,α,γ,γ-tetramethylbutylphenoxyethoxy)-β'-chlorodiethyl ether there is added, while stirring and cooling to 20° C., 55 g. of 98% sulphuric acid. The mixture is stirred for ten hours, during which time the temperature is held at 45° to 50° C. The thick oil obtained is neutralized with 10% caustic soda solution and then heated in an autoclave with 66 g. of anhydrous sodium sulphite (95.3% purity) and 270 cc. of water for eight hours at 150° to 160° C., at a pressure of 140 to 150 lbs. per square inch.

The soap-like solution obtained is a good detergent and emulsifying agent. The dried product is a white powder which is extremely soluble in water to give a foamy solution.

The β-(p-α,α,γ,γ-tetramethylbutylphenoxyethoxy)-β'-chlorodiethyl ether used in the above example is made from p-α,α,γ,γ-tetramethylbutylphenol, caustic soda, and β-chloroethoxy-β'-chlorodiethyl ether. It is a colorless oil boiling at 200° to 205° C./3 mm.

In a similar manner, the corresponding bromo ether or iodo ether can be employed, in which case the heating with sodium sulphite can be carried out under a reflux condenser at atmospheric pressure.

*Example 3*

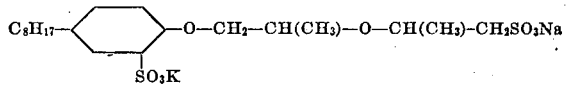

To 170 g. of p-ter-octylphenoxy-isopropoxyisopropyl chloride (a liquid boiling at 190° to 195° C./5 mm., made from β,β'-dichlorodiisopropyl ether, caustic soda, and p-α,α,γ,γ-tetramethylbutyl phenol), 60 g. of chlorosulphonic acid is added while cooling to 5° to 10° C. and stirring rapidly. After eight hours at 10° to 15° C. the mixture is allowed to come to room temperature and is neutralized with 10% potassium hydroxide solution. This solution is placed in an iron autoclave and heated at 160° to 170° C. for seven hours, with 66 g. of sodium sulphite (95% purity) and 270 cc. of water, during which time the pressure developed is 140–150 lbs. per square inch. The solution obtained is useful as a cleansing or emulsifying agent.

Example 4

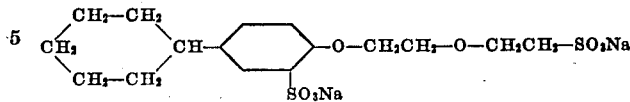

A mixture of 141 g. of p-cyclohexylphenoxyethoxyethyl chloride (a liquid boiling at 218° to 220° C./10 mm., made from p-cylohexylphenol, caustic soda and β,β'-dichlorodiethyl ether), and 60 g. of chlorsulphonic acid, was stirred at 10° to 15° C. for 6 hours, then neutralized with a 10% caustic soda solution. This solution was heated in an autoclave for six hours at 160° to 170° C. with 66 g. of anhydrous sodium sulphite. The clear solution obtained is useful as a penetrating agent for cotton.

Example 5

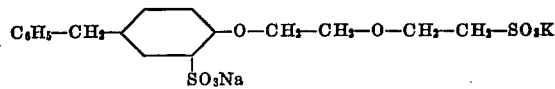

60 g. of chlorosulphonic acid is added dropwise to 145 g. of p-benzylphenoxyethoxyethyl chloride, while stirring and keeping the temperature at 5° to 10° C. After addition is complete, stirring is continued for four hours at 20° to 25° C., and the reddish product neutralized with 10% caustic soda solution. The product is then mixed with 83 g. of anhydrous potassium sulphite (95% purity) and 180 cc. of water, and heated in an autoclave for six hours at 165° to 170° C. The product is useful as a penetrant for cellulose.

Example 6

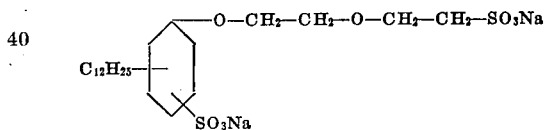

60 g. of chlorosulphonic acid is added at 5° to 10° C. to 184 g. of dodecylphenoxyethoxyethyl chloride (a colorless oil, B. P. 185–200°/4 mm., made from β,β'-dichlorodiethyl ether, and the mixed dodecylphenols obtained by heating technical lauryl alcohol and phenol with zinc chloride at 190° to 200° C. for sixteen to twenty-four hours) and the mixture stirred for eight hours at 15° to 20° C. The sulphonation product is then neutralized with dilute caustic soda and heated under pressure at 180° to 190° C. for eight hours with a mixture of 66 g. of anhydrous sodium sulphite (95%) and 280 cc. of water. The soap-like product obtained is treated with dilute hydrochloric acid until all traces of sulphite are destroyed, and then neutralized with caustic soda to pH 7. This product is a very effective emulsifying and cleansing agent.

Example 7

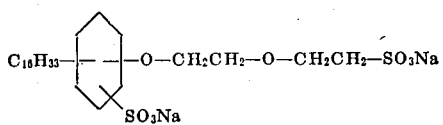

A compound having the above composition is obtained by condensing equal weights of cetyl alcohol, phenol and zinc chloride for eighteen hours at 190° to 200° C., and after washing out the zinc chloride, and removing unchanged phenol by fractionation, heating the residual oil for eight hours at 110° to 115° C. with one and one-half times its weight of β,β'-dichlorodiethyl ether and 0.30 of its weight of 50% caustic soda solution. The resulting cetylphenoxyethoxyethyl chloride is separated by vacuum distillation. It forms a pale yellow to colorless oil, boiling at 250° to 270° C./2 mm. This material is sulphonated with one-third its weight of chlorosulphonic acid at 10° to 20° C. for eight hours, and neutralized with 10% caustic soda solution. Sodium sulphite equal to one-third of the weight of the cetyl phenoxyethoxyethyl chloride is then added. The solution thus obtained is diluted with an equal volume of water and heated under pressure, with stirring, for eight hours at 180° to 190° C.

The resultant product is a powerful detergent and emulsifying agent.

By the same procedure, stearylphenol is converted to stearyl-phenoxyethoxyethyl chloride. This is sulphonated as above, neutralized with caustic alkali, and heated with an equivalent quantity of alkali metal sulphite under pressure at 180° to 190° C.

The sulphonated stearylphenoxyethoxyethyl sulphonate in the form of its sodium or potassium salt is a soap-like material having powerful detergent properties.

Example 8

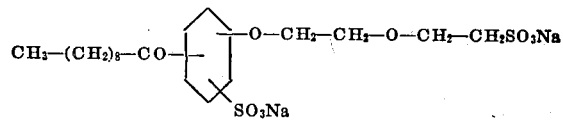

A mixture consisting of 86 g. decanoic acid, 188 g. phenol, and 34 g. boron trifluoride was heated, with stirring under a reflux condenser for 2 hours at 150–160° C. The product was washed with hot water and distilled in vacuo. Seventy-six g. of decanoylphenols were obtained, B. P. 184–220°/4 mm. A mixture of 62 g. of this decanoylphenol and 143 g. of β,β'-dichlorodiethyl ether, 11.7 g. sodium hydroxide, and 15 cc. water, was heated for 6 hours at 110–115° C. under reflux, with good agitation. After removing the sodium chloride, the product was fractionated in vacuo, yielding 50 g. of decanoylphenoxyethoxyethyl chloride as a pale yellow oil, B. P. 220–240° C./4 mm.

To 44 g. of decanoylphenoxyethoxyethyl chloride there was added dropwise 15.2 g. of chlorsulphonic acid, while stirring and cooling to 5° C. After 12 hours at room temperature, the sulphonation product was diluted with 100 cc. of water and neutralized with aqueous 10% sodium hydroxide solution. It was then mixed with 16.5 g. Na₂SO₃ and 100 cc. of water, and heated in an iron autoclave with stirring for six hours at 180–190° C. The soapy solution obtained was carefully treated with dilute hydrochloric acid until traces of sulphite were destroyed and the filtered solution, after adjustment to pH 7.5–8, evaporated to dryness. The product was a cream-colored powder having powerful detergent properties. It was stable to hot dilute acids or alkalies and gave no precipitates with calcium chloride or magnesium sulphate solutions.

In a similar manner, p-hydroxylaurophenone or p-hydroxystearophenone may be condensed with β,β'-dichlordiethyl ether, β-chloroethoxy-β'-chlorodiethyl ether and homologues thereof to yield long-chain acylphenoxy-polyalkylene ether chlorides which can be sulphonated in the phenyl nucleus and on the alkylene terminal halogen atom to yield valuable capillary-active compounds.

Example 9

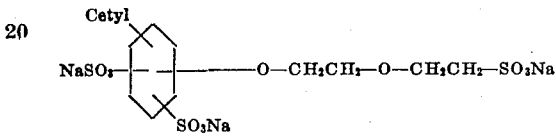

To 212 g. of cetylphenoxyethoxyethyl chloride there was added dropwise at 5° to 10° C., with constant stirring, 120 g. of chlorosulphonic acid. The mixture was stirred eight hours at 10° to 15° C., then at 25° to 30° C. for eight hours more. The product was neutralized with 5% caustic soda solution, then mixed with 66 g. of sodium sulphite (95%), and heated under pressure at 170° to 180° C. for six hours. The resultant aqueous solution shows powerful detergent action.

Example 10

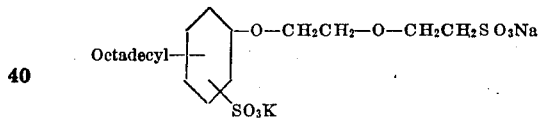

To 45 g. of octadecylphenoxyethoxyethyl chloride (a colorless oil, B. P. 240–270° C./4 mm., prepared from β,β'-dichlorodiethyl ether, sodium hydroxide and the octadecylphenols derived by heating equal weights of n-octa-decanol, phenol, and anhydrous zinc chloride at 185° C. for 18 hours) there was added dropwise 12 g. chlorsulphonic acid, while stirring and cooling to 5° C. The mixture was stirred for 12 hours at 20–25° C., and then neutralized with 10% aqueous potassium hydroxide. The soapy solution thus obtained was mixed with 16 g. anhydrous sodium sulphite, 50 cc. water, and heated with stirring in an iron autoclave at 180–190° C., for six hours. The product was treated with dilute hydrochloric acid to destroy traces of sulphite, adjusted to a pH 8, filtered, and evaporated to dryness. A white powder was obtained having a high degree of water-solubility and useful as an emulsifying and cleansing agent.

Example 11

In the manufacture of synthetic methanol by the action of hydrogen on carbon monoxide at high pressures in the presence of catalysts, there are obtained higher aliphatic primary and secondary alcohols having branched chains. A fraction of such alcohols boiling at 160–200° C. contains branched chain primary and secondary octyl-, nonyl-, decyl-, undecyl-, and possibly higher alcohols. Such a fraction was condensed at 185° C. with an equal weight of phenol and anhydrous zinc chloride for 18 hours while stirring under reflux. The mixed alkylphenols obtained boiled at 140–180° C./11 mm., and consisted essentially of mixed octyl-, nonyl-, decyl-, and undecylphenols, together with some of the corresponding ethers. Upon condensation of these mixed phenols with β,β'-dichlorodiethyl ether and sodium hydroxide at 110–115° C., the corresponding mixed chloroethoxyethyl ethers were obtained. This is a colorless oil boiling at 170–210° C./4 mm. and containing 10.6% chlorine by analysis.

156 g. of this material was sulphonated at 10° C. with 61 g. of chlorsulphonic acid and neutralized with a 10% solution of sodium hydroxide. The resulting soapy solution was then mixed with 60 g. sodium sulphite (95% purity) and 200 cc. of water, and heated at 180–190° C. in an iron autoclave for 8 hours. The resulting solution is a powerful wetting, dispersing and cleansing agent.

Example 12

A mixture consisting of 124 g. 5-ethyl-nonanol-2, 124 g. phenol, and 124 g. anhydrous zinc chloride was boiled while stirring under reflux for 18 hours. The product was washed with water and fractionated in vacuo, yielding 100 g. of an undecylphenol fraction boiling at 146–156° C./2 mm.

This product was condensed with excess β,β'-dichlordiethyl ether, and one mol. equivalent of caustic soda at 100–110° C. for 8 hours, to yield β-undecylphenoxy-β'-chlorodiethyl ether, boiling at 200–215° C./5 mm.

70.9 g. of the above chloroether was sulfonated with 24.3 g. of chlorsulphonic acid at 5–10° C. for ½ hour, then stirred for 18 hours at room temperature, and neutralized with 10% sodium hydroxide solution. The aqueous solution obtained was mixed with 26 g. Na₂SO₃ and heated in an iron autoclave at 180–190° C. while stirring for 6–8 hours. The soapy solution obtained was warmed with dilute acetic acid to destroy sulphites, neutralized and evaporated to dryness. Product was a white, water-soluble powder, having detergent and emulsifying properties.

The reactions herein described are applicable to all aryloxypolyalkylene ether halides of the general formula herein set forth.

As further examples of the chlorides which may be used in the present invention, the following are given, together with their physical constants.

β-(β-naphthoxy)-β'-chlorodiethyl ether. Oil. B.P. 215° C./10 mm.

β-(o-benzylphenoxy)-β'-chlorodiethyl ether. Oil. B. P. 230–233°/10 mm.

β-(o-cyclohexylphenoxy)-β' chlorodiethyl ether. Oil. B. P. 206–209°/10 mm.

β-(o-phenylphenoxy)-β'-chlorodiethyl ether. Oil. B. P. 211–213°/10 mm.

β-(p-phenylphenoxy)-β'-chlorodiethyl ether. Solid. M. P. 51° C.

β-thymoxy-β'-chlorodiethyl ether. Oil. B. P. 176–178°/10 mm.

β-(3,5-dimethylphenoxy)-β'-chlorodiethyl ether. Oil. B. P. 168°/10 mm.

β-(p-ter-amylphenoxy)-β'-chlorodiethyl ether. Oil. B. P. 153–155°/3 mm.

β-(p-ter-butylphenoxy)-β'-chlorodiethyl ether. Oil. B. P. 184–186°/10 mm.

β-phenoxyethoxy-β'-chlorodiethyl ether. Oil. B. P. 148–151° C./4 mm.

β-(p-ter-butylphenoxyethoxy)-β'-chlorodiethyl ether. Oil. B. P. 165–168°/3 mm.

β-(p-ter-amylphenoxyethoxy)-β'-chlorodiethyl ether. Oil. B. P. 189–191°/4 mm.

β - (p - nitrophenoxyethoxy) - β' - chlorodiethyl ether. Oil. B. P. 213–215°/2 mm.
β - (o - benzylphenoxyethoxy) - β' - chlorodiethyl ether. Oil. B. P. 205–208°/3 mm.
β - (o - chlorophenoxyethoxy) - β' - chlorodiethyl ether. Oil. B. P. 165–171°/3 mm.
β - (o - methoxyphenoxyethoxy) - β' - chlorodiethyl ether. Oil. B. P. 165–170°/3 mm.
β-thymoxyethoxy-β'-chlorodiethyl ether. Oil. B. P. 171–174°/3 mm.
β-p-cresyloxyethoxy-β'-chlorodiethyl ether. Oil. B. P. 168–171°/3 mm.
β - (2,4-dichlorophenoxyethoxy) -β'-chlorodiethyl ether. Oil. B. P. 188–193°/4 mm.
β - (p - benzylphenoxyethoxy) - β' - chlorodiethyl ether. Oil. B. P. 241–247°/4 mm.
β - (p - benzoylphenoxyethoxy) -β'-chlorodiethyl ether. Oil. B. P. 250–260°/3 mm.
β-(p-cyclohexylphenoxyethoxy)-β'-chlorodiethyl ether. Oil. B. P. 198–200°/3 mm.
β-(β-naphthoxyethoxy)-β'-chlorodiethyl ether. Oil. B. P. 207–212°/3 mm.
β - (p - phenylphenoxyethoxy) - β'-chlorodiethyl ether. Solid. M. P. 58° C.

It has already been proposed to sulphonate phenols of various kinds and aromatic ethers, such as laurylbenzyl ether. However, none of the compounds heretofore produced contains a sulphonic group in the ring as well as in the side-chain, and a plurality of ether linkages. I have found that the molecular configuration of the present compounds leads to high water-solubility and extreme resistance to precipitation by magnesium, iron, or calcium salts. Aqueous solutions of these compounds, especially those having eight to eighteen carbon atoms in the alkyl or acyl group, cause a very great lowering of the surface tension as well as of the interfacial tensions against oils. They have high spreading coefficients, and high swelling and penetration values.

They may be added to dye baths to promote even dyeing, or to caustic mercerizing baths to assist penetration. They are useful as spreaders for insecticides, wetting agents for sulphur, zinc oxide, clays, Portland cement, and various pigments. When used in conjunction with hard water and ordinary soaps, they prevent the precipitation of calcium and magnesium soaps, and in case any such have been formed, will redisperse the precipitate, thus preventing it from staining fabrics which are being dyed or cleaned. In the acidic form they may be condensed with aldehydes such as formaldehyde, to yield complex water-soluble materials, useful as tanning agents for leather.

I claim:
1. A compound of the general formula

$$R-O-R'SO_3M$$
$$\qquad |$$
$$\qquad SO_3M$$

in which R is an aromatic group, R' a polyalkylene ether radical, and M is a member of the group consisting of hydrogen and alkali metals.

2. A water-soluble salt of a compound which, in the acidic form, has the general formula

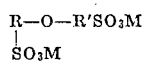

wherein $n$, $x$ and $y$ are small integers, $n$ being 2 to 3; $x$ is 1 to 2; $y$ being 1 to 2; and R is an aromatic nucleus of the benzene and naphthalene series which can contain as a nuclear substituent a member of the group consisting of hydrocarbon, acyl, halogen, alkoxy, and nitro groups; $C_nH_{2n}$ being an alkylene group in which at least two carbon atoms separate alternate ether oxygen atoms —O—; said salt being a member of the group consisting of alkali metal, ammonium and amine salts.

3. An alkali metal salt of a polysulphonic acid having the general formula

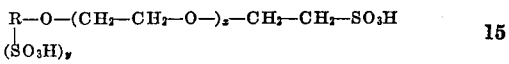

wherein $x$ and $y$ are small integers, $x$ is 1 to 2; $y$ being 1 to 2; and R is an aromatic nucleus of the benzene and naphthalene series, which can contain as a nuclear substituent a member of the group consisting of hydrocarbon, acyl, halogen, alkoxy and nitro groups.

4. An alkali metal salt of a polysulphonic acid having the general formula—

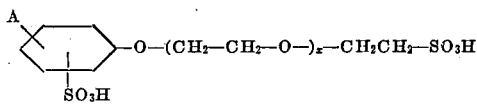

wherein $x$ is 1 to 2, and A is an aliphatic open-chain radical.

5. An alkali metal salt of a polysulphonic acid having the general formula—

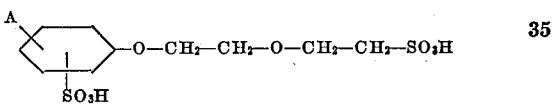

wherein A is an alkyl group containing from 8 through 18 carbon atoms.

6. The compound

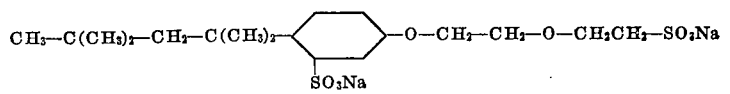

7. A process of preparing a compound of the general formula

in which R is an aromatic group, R' a polyalkylene ether radical, and M a member of the group consisting of hydrogen and alkali metals, which comprises treating a compound of the general formula R—O—R'Cl with a member of the group consisting of concentrated and fuming sulphuric acid, chlorsulphonic acid and sulphur trioxide to sulphonate the aromatic group, neutralizing the sulphonic acid thus formed with an alkali metal hydroxide and thereafter heating the resulting salt with an alkali metal sulphite to split out the alkali metal chloride.

8. A process for preparing compounds which, in the acidic form, have the general formula—

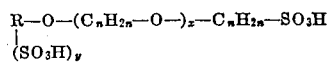

wherein $n$, $x$, and $y$ are small integers, $n$ being 2 to 3; $x$ is 1 to 2; $y$ being 1 to 2, and R is an aromatic nucleus of the benzene and naphthalene series, $C_nH_{2n}$ being an alkylene group in which at least two carbon atoms separate alternate ether oxygen atoms; which comprises treating a compound of the general formula—

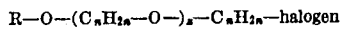

with an acid sulphonating agent to sulphonate the aromatic nucleus $y$ times, neutralizing the product thus formed with an alkali, and thereafter heating the resultant salt with a solution of an alkali metal sulphite to split out alkali metal halide.

9. A process for preparing compounds which, in the acidic form, have the general formula—

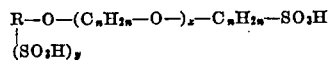

wherein $n$, $x$ and $y$ are small integers, $n$ being 2 to 3; $x$ is 1 to 2, $y$ being 1 to 2, and R is an aromatic nucleus of the benzene and naphthalene series, $C_nH_{2n}$ being an alkylene group in which at least two carbon atoms separate alternate ether oxygen atoms; which comprises treating a compound of the general formula R—O—$C_nH_{2n}$—O—)$_x$—$C_nH_{2n}$Cl with at least one equivalent of chlorsulphonic acid so as to sulphonate R, neutralizing the sulphonic acid thus formed with an alkali metal base, and heating the resultant salt in an autoclave with an aqueous solution of an alkali metal sulphite to a temperature between 130 and 190° C. so as to split out alkali metal chloride.

10. A process for preparing capillary-active substances, which comprises sulphonating the aromatic ring of a compound having the formula

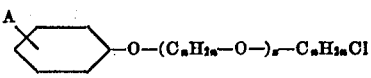

wherein A is an aliphatic open-chain radical which is a member of the group consisting of alkyl and acyl radicals having at least 8 carbon atoms, $n$ is 2 to 3, and $x$ is 1 to 2; neutralizing the sulphonic acid formed with an alkali metal base, and heating the product with an alkali metal sulphite so as to split out alkali metal chloride.

HERMAN A. BRUSON.